(12) United States Patent
Chomsky et al.

(10) Patent No.: US 8,792,530 B2
(45) Date of Patent: Jul. 29, 2014

(54) LASER ARRANGEMENT AND SYSTEM, AND A MEDICAL LASER TREATMENT SYSTEM THEREOF

(75) Inventors: Doron Chomsky, Rehovot (IL); Dror Medini, Kadima (IL)

(73) Assignee: Dentaray Ltd., Netanya (IL)

( * ) Notice: Subject to any disclaimer, the term of this patent is extended or adjusted under 35 U.S.C. 154(b) by 0 days.

(21) Appl. No.: 13/816,232

(22) PCT Filed: Aug. 9, 2011

(86) PCT No.: PCT/IL2011/000649
§ 371 (c)(1),
(2), (4) Date: Mar. 13, 2013

(87) PCT Pub. No.: WO2012/010408
PCT Pub. Date: Feb. 16, 2012

(65) Prior Publication Data
US 2013/0215920 A1    Aug. 22, 2013

Related U.S. Application Data

(60) Provisional application No. 61/372,275, filed on Aug. 10, 2010.

(51) Int. Cl.
| | |
|---|---|
| *H01S 3/22* | (2006.01) |
| *C08G 64/02* | (2006.01) |
| *C08G 64/30* | (2006.01) |
| *C09D 169/00* | (2006.01) |
| *H01S 3/097* | (2006.01) |
| *C08K 5/3492* | (2006.01) |
| *C08K 5/29* | (2006.01) |

(52) U.S. Cl.
CPC ............ *H01S 3/097* (2013.01); *C08G 64/0208* (2013.01); *C08K 5/34922* (2013.01); *C08G 64/305* (2013.01); *C08K 5/34924* (2013.01); *C08K 5/29* (2013.01); *C09D 169/00* (2013.01)
USPC .................. 372/55; 372/57; 372/92; 372/95; 372/99

(58) Field of Classification Search
CPC ............ H01S 3/00; H01S 3/03; H01S 3/032; H01S 3/034; H01S 3/038; H01S 3/086; H01S 3/0943; H01S 3/097
USPC ......................................... 372/55, 57, 92, 95
See application file for complete search history.

(56) References Cited

U.S. PATENT DOCUMENTS

| 3,743,963 A | 7/1973 | Bullis |
| 5,097,472 A | 3/1992 | Chenausky |

(Continued)

OTHER PUBLICATIONS

International Search Report for PCT/IL2011/00649 issued by USPTO Jan. 9, 2012.

*Primary Examiner* — Dung Nguyen
(74) *Attorney, Agent, or Firm* — Simon Kahn

(57) ABSTRACT

A method for providing a laser beam and a laser arrangement that includes an elongated tube; an elongated discharge region within the elongated tube including a discharge medium to be excited to induce laser radiation; two DC discharge electrodes disposed at opposite ends of the elongated discharge region; two RF electrodes disposed at opposite elongated sides of the elongated discharge region; and/or a laser resonator having two opposite mirrors disposed at opposite ends of the elongated tube, the laser resonator is unstable in at least one lateral axis. The method includes applying a DC discharge between the DC electrodes, and applying a RF discharge transverse to the DC discharge between the RF electrodes. The DC and RF discharges may be provided by the DC and/or RF voltage suppliers provided according to embodiments of the present invention.

16 Claims, 3 Drawing Sheets

(56) References Cited

U.S. PATENT DOCUMENTS

| | | |
|---|---|---|
| 5,148,438 A | 9/1992 | Remo |
| 5,479,428 A | 12/1995 | Kuzumoto |
| 5,528,613 A | 6/1996 | Macken |
| 5,596,593 A | 1/1997 | Crothall |
| 6,215,807 B1 | 4/2001 | Reilly |
| 6,603,792 B1 * | 8/2003 | Chomsky ........................ 372/87 |
| 2007/0019701 A1 | 1/2007 | Sherstobitov |
| 2007/0205727 A1 * | 9/2007 | Tamita et al. .................. 315/291 |
| 2008/0285607 A1 | 11/2008 | Murray |
| 2010/0189156 A1 | 7/2010 | Clementi |

* cited by examiner

LASER ARRANGEMENT AND SYSTEM, AND A MEDICAL LASER TREATMENT SYSTEM THEREOF

BACKGROUND OF THE INVENTION

Gaseous lasers have found extensive applications in the laser processing industry, including laser cutting, welding of materials, laser hardening through phase transformation, and in medical applications. In particular, in recent years, there has been considerable investigation into various forms of carbon dioxide gas ($CO_2$) lasers, which radiate at wavelengths between 9 and 11 µm, and may be operated in Continuous Wave (CW) or pulsed regimes. While other gas lasers have efficiency of 0.1% or less, the $CO_2$ laser may have efficiency of up to about 30%.

For excitation of the $CO_2$ lasers, it is known to utilize DC (direct current) pulsed electric discharge and/or RF (radio frequency) alternating electric discharge. It has been suggested in the prior art to utilize combined DC and RF discharges for the excitation of $CO_2$ cylindrical lasers. The prior art cylindrical lasers utilizing a combined DC and RF discharge operate with optically stable resonators that normally comprise, disposed at opposite ends of a laser cavity, a highly reflective output mirror which functions both to reflect internal radiation beams into the laser cavity and to transfer an output radiation beam exiting out of the laser cavity, and a feedback mirror. The two mirrors allow the internal beams to numerously oscillate inside the laser cavity in order to get high gain and improved directionality of the output beam.

A problem exists with the use of optically stable resonators in lasers where high output power is achieved by the increase of the laser tube inner diameter. Namely, it is known that an optically stable resonator operates in a multi-mode regime and produces a low quality laser beam, when its Fresnel number $N_F = \alpha^2/(\lambda L)$ exceeds the value of 2, where $\alpha$ is a radial dimension of an exposed output mirror surface, $\lambda$ is the wavelength of radiation inside the resonator, and L is the resonator length.

It has been known in the prior art to provide a powerful laser equipped with an unstable optical resonator with a relatively large Fresnel number ($N_F > 3$). The unstable resonator has primary and feedback mirrors, wherein the primary mirror is of a larger diameter than the feedback mirror so that the output radiation reflected from the periphery of the primary mirror is directed out of the laser cavity in a ring shaped beam surrounding the feedback mirror. The unstable resonator produces high optical quality beam, which may extract energy out of the entire gain volume. Furthermore, in view of the fact that the number of times the laser beam passes the laser cavity is small, the use of optically unstable resonators requires a specific care to be taken of the gain in the laser medium.

It is generally known that, in prior art gas lasers having an unstable resonator, the gain may be enhanced by the increase of the gas pressure. However, usage of high pressure in pulsed lasers normally decreases the pulse repetition frequency since the gas needs a relatively long time in order to recover. Hence, conventional pulsed lasers having an unstable resonator cannot operate with high pressure and, therefore, pulses provided thereby are normally of relatively small averaged power, which inevitably limits their applications.

It is also generally known that a hybrid unstable resonator is applied in laser cavities with large Fresnel number. Such resonators are generally used with asymmetrical gain medium lasers such as $CO_2$ RF excited slab lasers. For the same reasons indicated above regarding unstable resonators, it is not efficient to increase the power of lasers which utilize hybrid resonators by increasing the gas pressure. Therefore, the main advantage of the hybrid unstable resonator is to operate in relatively low gain lasers with high efficiency.

The hybrid unstable resonator yields a laser beam which is diffraction limited on one axis and with multi mode degraded quality on the other axis. However, the effective beam quality is better than then stable resonator laser beam quality.

SUMMARY OF THE INVENTION

Embodiments of the present invention provide a method for providing a laser beam and a laser arrangement that may include an elongated tube; an elongated discharge region within the elongated tube including a discharge medium to be excited to induce laser radiation; two DC discharge electrodes disposed at opposite ends of the elongated discharge region; two RF electrodes disposed at opposite elongated sides of the elongated discharge region; and/or a laser resonator having two opposite mirrors disposed at opposite ends of the elongated tube, the laser resonator may be unstable in at least one lateral axis.

In some embodiments of the present invention, the laser arrangement may include a DC voltage supplier to apply pulsed DC electric discharge on the DC electrodes. The DC voltage supplier may include a DC source, a pulse shaper to shape into pulses a DC signal provided by the DC source, a high voltage transformer to provide a high output voltage for exciting the discharge medium and/or an output smoother. The transformer may have a transformation ratio of about 1:40.

In some embodiments of the present invention, the laser resonator may be a hybrid stable and unstable resonator, the hybrid resonator may include an output mirror disposed at an output end of the elongated tube from which the output radiation beam may come out, the output mirror may have in its internal side an optical power in an lateral axis in which the hybrid resonator is unstable; and a feedback mirror disposed at a second end of the elongated tube, the feedback mirror may have different optical powers in two orthogonal lateral axes, one of which is the axis in which the hybrid resonator is unstable. The optical power of the feedback mirror in the axis in which the hybrid resonator is unstable may be higher than the optical power of the feedback mirror in the orthogonal lateral axis. Additionally, the output mirror and feedback mirror may constitute a co-focal negative branch unstable resonator in the axis in which the hybrid resonator is unstable. The output mirror may include a mask to determine the lateral cross section of the output beam. The output mirror and feedback mirror may reflect mainly a desired radiation wavelength and transmit other wavelengths.

In some embodiments of the present invention, the laser arrangement may include an RF voltage supplier, the RF voltage supplier may include a RF source to apply RF pulses on said RF electrodes.

The method according to embodiments of the present invention may include applying a DC discharge between the DC electrodes, and applying a RF discharge transverse to the DC discharge between the RF electrodes. The DC and RF discharges may be provided by the DC and/or RF voltage suppliers provided according to embodiments of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
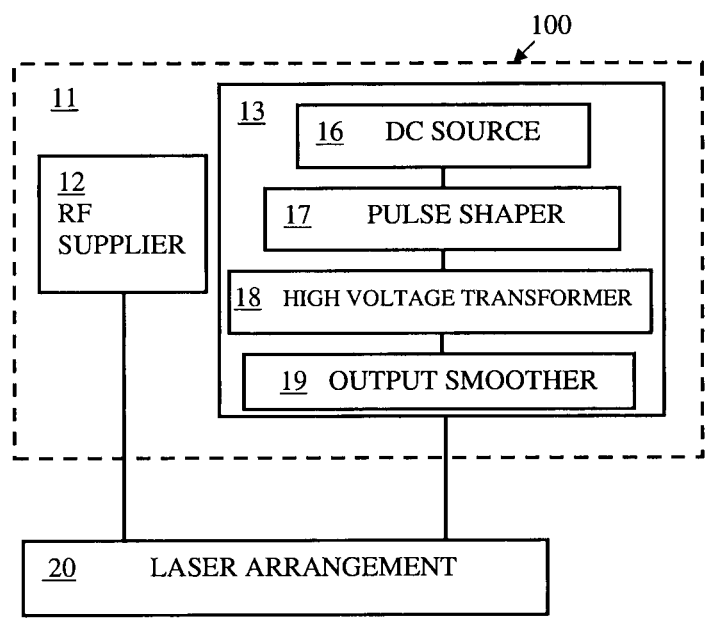
FIG. 1 is a schematic block illustration of a laser system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The possibility to increase the output power of a cylindrical DC and/or RF excited $CO_2$ laser by the design of its geometry is usually limited, in some cases due to its output power scaling. In particular, the output power of such a laser may be increased only by increasing the length of the laser cavity and it cannot be increased by increasing the inner diameter thereof due to temperature limitations and/or, in some cases, because of thermal instability, which may deteriorate the laser beam quality and its pointing stability.

Embodiments of the present invention provide a laser arrangement and system, which may provide sufficiently high power laser beam with good optical quality, wherein the laser beam is provided in sufficiently short pulses duration, for example which is suitable to medical applications. Some embodiments of the present invention relate to medical applications of laser, such as, especially, laser ablation treatment in teeth. For some treatments, for example treatments in teeth enamel, it is more suitable to use a secondary absorption wavelength of the gain material, which may provide lower energy relative to the main absorption wavelength. For example, whilst an absorption wavelength of 10.6 μm is usually used in $CO_2$ laser treatments in soft tissues such as, for example, gums, a secondary absorption wavelength of 9.6 μm may be used, according to embodiments of the present invention, in $CO_2$ laser treatments in tooth enamel in more efficient and/or less damaging manner.

The 9.6 μm absorption line may be utilized by picking suitable mirror coatings for the laser resonator mirrors, which may provide enhanced feedback in the desired wavelength. Since the absorption wavelength of 9.6 μm may provide less energy per pulse relative to the 10.6 μm absorption line, in order to overcome this weakness, the laser arrangement and system according to embodiments of the present invention may enable higher energy per pulse, without reducing in a substantial manner the optical quality of the laser beam and without extending in a substantial manner the duration of each of the laser treatment pulses.

Reference is now made to FIG. 1, which is a schematic block illustration of a laser system 100 according to embodiments of the present invention. Laser system 100 may include a laser arrangement 20, a RF supplier 12 and a DC supplier 13. RF supplier 12 and DC supplier 13 may be included in the same power supply unit 11, or may be each in separate unit. DC Supplier 13 may include a DC source 16, a pulse shaper 17, a high voltage transformer 18 and an output smoother 19. Laser arrangement 20 may include a tube, an elongated discharge region, resonator mirrors, DC electrodes and RF electrodes, as shown in more detail in FIG. 2. The discharge region may include an active gaseous medium which may include, for example, carbon dioxide ($CO_2$) or another suitable medium.

RF supplier 12 and DC supplier 13 may be used to excite the gaseous medium by applying alternating and pulsed DC electric discharge, respectively. The pulsed DC electric discharge may be applied by DC supplier 13 on DC electrodes disposed at opposite ends of the elongated discharge region, for applying longitudinal discharge on the discharge region. The alternating discharge may be applied by RF supplier 12 on RF electrodes disposed one against another along the elongated sides of the discharge region, for applying transverse RF discharge across the discharge region. An object of laser system 100, according to embodiments of the present invention is to provide relatively large amount of energy per laser pulse without damaging the optical quality of the laser beam, e.g. without increasing the beam diameter. High power pulsed DC exited $CO_2$ lasers may be considerably thermally unstable, which may damage the laser beam quality. The thermal instability may occur due to concentration of the plasma discharge to a small portion of the discharge region volume, which may result in acoustic oscillations and produce high temperature electrons which may decompose the $CO_2$ molecules, which may deteriorate the laser beam quality and its pointing stability. These phenomena usually limit the manufacturing of powerful DC excited lasers to lasers having compact sizes. However, embodiments of the present invention include transverse RF discharge orthogonal to the DC discharge and, for example, in the radial direction of the laser tube, wherein the DC discharge is applied longitudinally on the discharge region. The transverse RF discharge improves the uniformity of the excitation of the gas medium across the discharge region, thus improving the thermal stability of the laser. On the other hand, since RF power is more expensive, the reduction of consumed RF power by dividing the power consumption between RF power and DC power reduces the price of the laser and its operation.

By using the combination of RF discharge and DC discharge according to embodiments of the present invention, the laser operating efficiency is increased, with a significant lowering of required excitation voltages, and a substantial reduction in excitation hardware. Moreover, the combined use of the DC and RF may provide high density of the electric energy. In some embodiments, the density of the electric field that may be obtained by the combined use of the DC and RF discharges may reach 20 W/cm$^3$. Such a high density of the electric energy may provide for an increased gain in the discharge region at medium pressures of the laser gas. The increased gain that may be provided in relatively low pressures may enable the use of an optically unstable resonator in laser arrangement 20, without compromise on the output beam power and without decreasing the pulse repetition in an essential manner. The pulses enabled by the laser arrangement according to embodiments of the present invention, may be in a rather broad range of duration of 0.05-1 msec. In order to provide a laser beam with good optical quality, it is preferable to use a hybrid resonator.

In DC supplier 13, pulse shaper 17 may shape the DC signal provided by DC source 16 into pulses. High voltage transformer 18 may be used for changing the voltage to the high voltage value required for the laser. In some cases, the resulting output voltage pulses are too sharp, so that the amount of electrical energy provided per pulse may be too low. Therefore, output smoother 19 may be required in order to smooth the signals so that the voltage will not change so sharply. Output smoother 19 may include, for example, a capacitor connected in parallel and/or an inductor connected in series to transformer 18.

Figure 2:
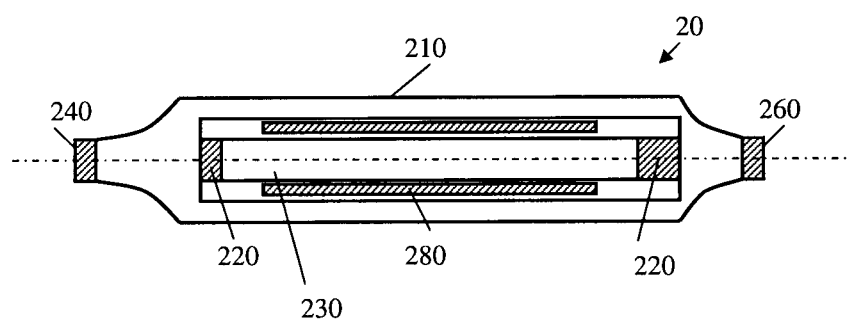
FIG. 2 is a schematic illustration of laser arrangement according to embodiments of the present invention.

Reference is now made to FIG. 2, which is a schematic illustration of laser arrangement 20 according to embodiments of the present invention. Laser arrangement 20 may include a tube 210, RF electrodes 280, DC electrodes 220, an elongated discharge region 230, output mirror 240 and feedback mirror 260. Elongated discharge region 230 may include an active gaseous medium which may include, for example, carbon dioxide ($CO_2$) or another suitable medium to be excited in the discharge region so as to emit photons of induced radiation. In embodiments of the present invention, the excitation may be induced by a combination of DC and RF discharges by DC electrodes 220 and RF electrodes 280. DC electrodes 220, as discussed above, may be disposed at opposite ends of elongated discharge region 230, for applying longitudinal pulsed DC discharge on the discharge region 230, for example, by DC supplier 13 shown in FIG. 1. RF electrodes 280, as discussed above, may be disposed one against another along the elongated sides of discharge region 230, for applying transverse RF discharge across discharge region 230, for example by RF supplier 12 shown in FIG. 1.

Output mirror 240 and feedback mirror 260 may constitute a hybrid resonator. Output mirror 240 and feedback mirror 260 may be disposed at opposite ends of tube 210, in order to form an outlet beam of the radiation induced by the DC and RF discharges. Output mirror 240 is positioned at an output end of tube 210, i.e. from which the output radiation is to come out. Feedback mirror 260 may be positioned at another end, e.g. the back end, of tube 210. Output mirror 240 may be designed to enable transmission of the output beam. For example, output mirror 240 may include a mask which may determine the lateral cross section of the beam. Additionally, output mirror 240 may reflect into the tube mainly the desired gain wavelength, for example the 9.6 µm absorption wavelength, as discussed in detail above. Output mirror 240 may enable transmission of other, for example, unutilized, wavelengths. Additionally, output mirror 240 may have in its internal side, i.e. the side facing inward the tube, an optical power in one lateral axis, which is the axis in which the hybrid resonator is unstable. Feedback mirror 260 may substantially totally reflect the desired gain wavelength, e.g. the 9.6 µm wavelength. Feedback mirror 260 may enable transmission of other, for example, unutilized, wavelengths. Feedback mirror 260 may have different optical powers in two orthogonal lateral axes. Feedback mirror 260 may have a relatively large radius of curvature, i.e. small optical power, in the axis in which the hybrid resonator is stable. Feedback mirror 260 may have a relatively small radius of curvature, i.e. high optical power, in the axis in which the hybrid resonator is unstable, for example in which mirrors 240 and 260 may constitute a co-focal negative branch unstable resonator.

The ratio between the radii of feedback mirror 260 and output mirror 240 along the axis in which the hybrid resonator is unstable determines the magnification of the resonator and thus the laser output coupling. The use of a hybrid resonator may enable a high laser beam optical quality, provided by a large diameter laser tube relative to usual medical-purpose lasers. The larger diameter laser tube enables higher laser beam power.

Figure 3:
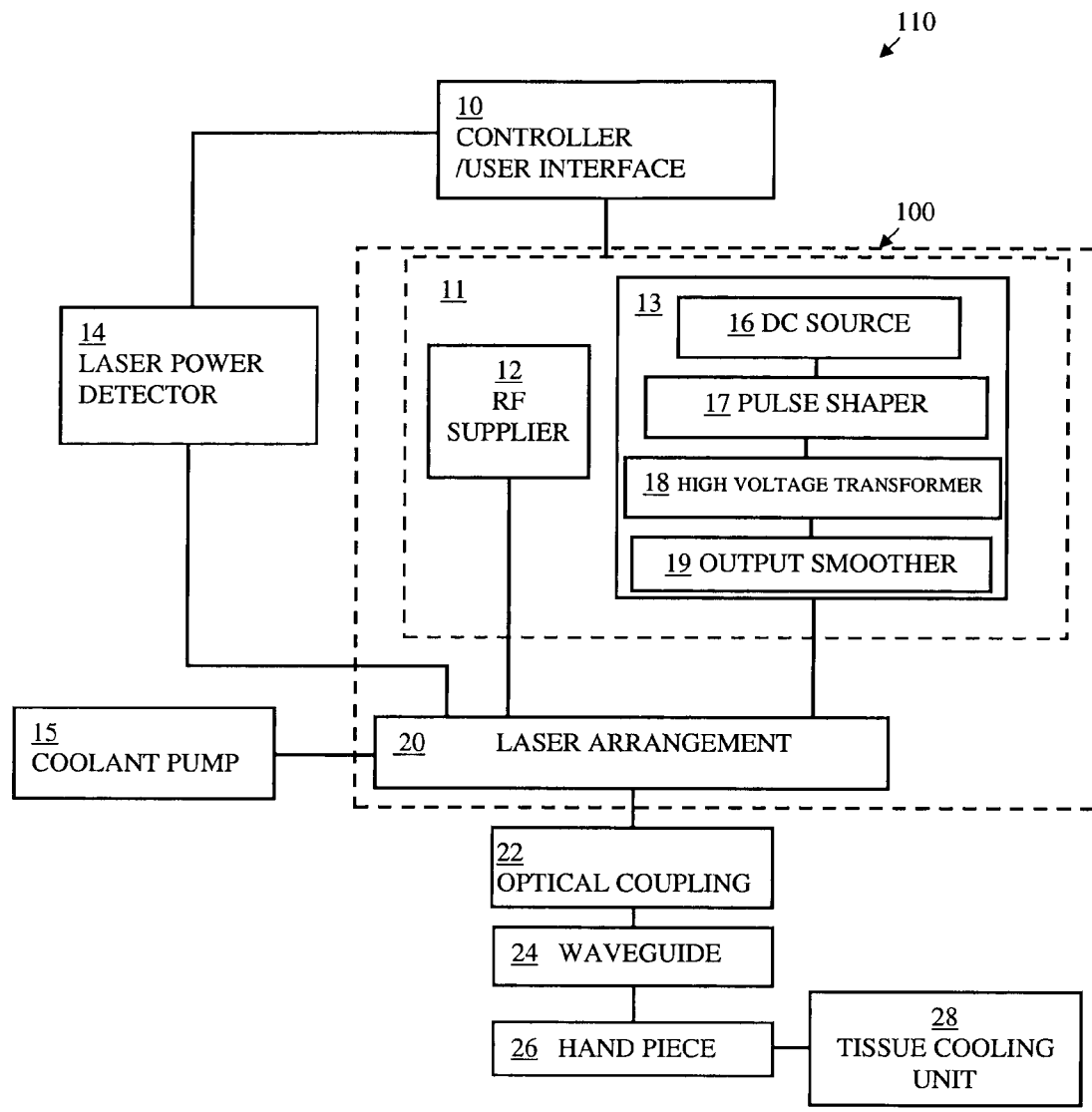
FIG. 3 is a schematic block illustration of a medical treatment system according to an exemplary embodiment of the present invention.

According to some embodiments of the present invention, laser system 100 may be included in a medical treatment system. FIG. 3 is a schematic block illustration of a medical treatment system 110 according to an exemplary embodiment of the present invention. Medical treatment system 110 may include laser system 100, which may include similar components as described with reference to FIG. 1. System 110 may include a controller and/or user interface 10, which may control the operation of laser system 100. System 110 may include a laser power detector 14, which may detect the laser power at the output of laser arrangement 20. Laser power detector 14 may report the detected output power to controller 10, which may control laser system 100 accordingly. System 110 may further include a coolant pump 15, an optical coupling 22, a waveguide 24, a hand piece 26 and a tissue cooling unit 28. Coolant pump 15 may prevent over-heating of laser arrangement 20. Optical coupling 22 and waveguide 24 may adapt the laser beam and guide it to hand piece 26, which may be used for providing a laser treatment by a professional or other user. Tissue cooling unit 28 may be used for cooling the tissue after and/or during the treatment, for example by water spray.

Figure 4:
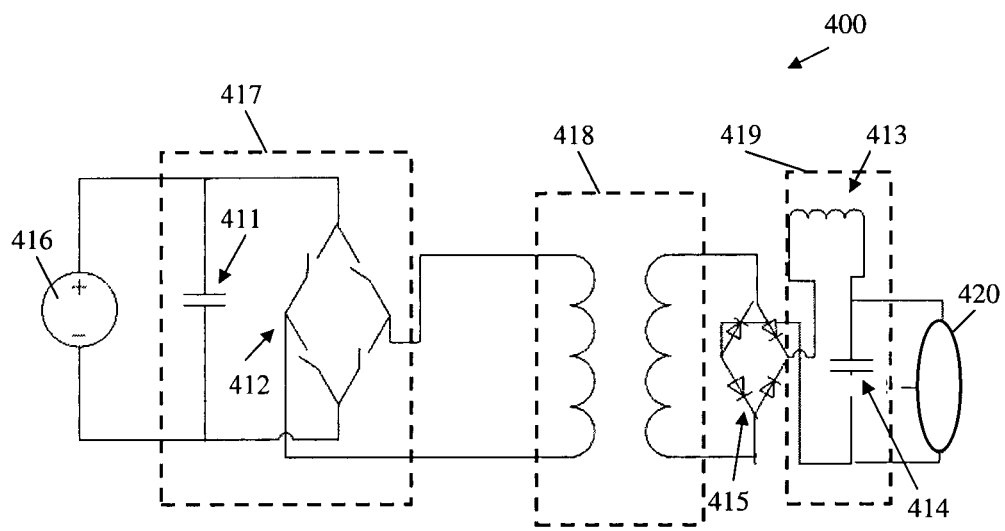
FIG. 4 is a schematic illustration of a pulsed DC high power voltage supply for a laser arrangement according to embodiments of the present invention.

As mentioned above, without the transverse RF discharge the gaseous medium may become considerably thermally unstable when excited by pulsed high power DC voltage supply, to an extent which may deteriorate the laser beam quality. For this reason, usually a current source is used, which may be much more expensive and much less efficient in the required power levels, relative to a voltage source. The use of transverse RF discharge according to embodiments of the present invention may have stabilizing effect on the laser, which may enable implementation of a DC pulsed high power voltage supply. Reference is now made to FIG. 4, which is a schematic illustration of a pulsed DC high power voltage supply 400 for a laser arrangement according to embodiments of the present invention. The high output voltage is provided to a laser arrangement 420 by inductance, which may result in optimal power transfer into the discharge region in laser 420. Other passive manners of voltage transfer may be used. Voltage supply 400 may include a DC voltage source 416, a pulse shaper 417, a high voltage transformer 418, a rectifier 415 and an output smoother 419.

Pulse shaper 417 may shape the DC signal provided by DC source 416 into pulses. Pulse shaper 417 may include, for example, an inverter 412 connected in parallel to a capacitor 411. Capacitor 411 may store the energy for each pulse. Inverter 412, which may include a four-switch bridge, an H-bridge a FET bridge and/or any other suitable component, may change alternately the direction in which the voltage is applied, so that the resulting pulse may have, for example, with an appropriate capacitor time constant and corresponding timing of the inverter, a substantially triangular wave form. High voltage transformer 418 may provide a high output voltage needed for exciting the discharge medium. In some embodiments, transformer 418 may have a transformation ratio of, for example, about 1:40, i.e. the output voltage may be about 40 times higher than the input voltage.

Rectifier 415 may convert the pulsed output voltage into a constant polarity pulsed voltage, for example by a diode bridge.

Output smoother 419 may smooth the resulting output voltage pulses, such that, for example, the voltage will not change too sharply in each pulse, which may cause the amount of electrical energy provided per pulse to be insufficient. Output smoother 419 may include, for example, a capacitor 414 connected in parallel and/or an inductor 413 connected in series to transformer 418.

Figure 5:
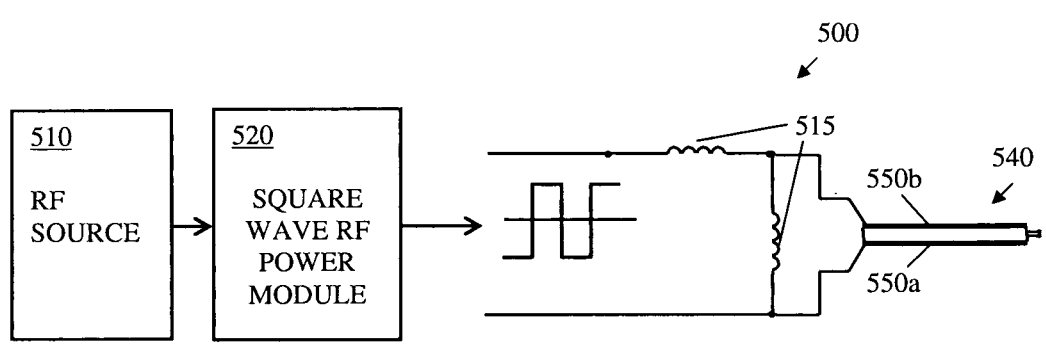
FIG. 5 is a schematic illustration of a RF generator for a laser arrangement according to embodiments of the present invention.

Reference is now made to FIG. 5, which is a schematic illustration of a RF generator 500 for a laser arrangement according to embodiments of the present invention. RF generator 500 may include a RF source 510, a Square wave RF power module 520 and an inductor 515. RF source 510 may provide RF voltage as input to Square wave RF power module 520, which may shape the RF voltage into square pulses. Square wave RF power module 520 may include, for example, an inverter which may include, for example, a four-switch bridge, a push pull configuration and/or any other suitable component, may change alternately the direction in which the voltage is applied on inductor 515. Additionally, Square wave RF power module 520 may include a transformer, for example, in order to amplify the voltage. Inductor 515 may be connected in parallel or in series to RF electrodes 550a and 550b of a laser arrangement 540. Before the excitation of the active gaseous medium between electrodes 550a and 550b, electrodes 550a and 550b may constitute a capacitor, thus providing a parallel or series or parallel-series combination resonant response, for example together with inductor 515. In some embodiments, the voltage may be applied on electrodes 550a and 550b without the mediation of inductor 515. Before the excitation of the active gaseous medium the resonant response may have a high Q factor, because substantially no energy is being consumed between electrodes 550a and 550b. Therefore, a high RF voltage between electrodes 550a and 550b may be provided, which may facilitate the excitation and ionization of the active gaseous medium. When the gaseous medium becomes ionized, an ohmic resistance is formed between electrodes 550a and 550b which may consume the provided RF energy.

Accordingly, RF generator 500 enables RF excitation of the active gaseous medium by utilizing the capacitive nature of the laser before the excitation and the ohmic resistance formed between the laser plates when the gaseous medium becomes ionized, as operative factors of RF generator 500, which forces the operation of RF generator 500 to be matched with the laser operation. Therefore, substantially no matching network is required for the operation of RF voltage generator 500 and the laser system. This may enable fluent operation of the laser system and high rise time and short pulses. Additionally, substantially no calibrations and re-calibrations are needed as the operation of RF generator 500 is inherently calibrated with the laser system.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A laser arrangement comprising:
    an elongated tube;
    an elongated discharge region within said elongated tube including a discharge medium to be excited to induce laser radiation;
    DC discharge electrodes disposed at opposite ends of the elongated discharge region;
    RF electrodes disposed at opposite elongated sides of the elongated discharge region; and
    a hybrid stable and unstable laser resonator having an output mirror and a feedback mirror,
    said output mirror disposed at an output end of said elongated tube, said feedback mirror disposed at a second end of said elongated tube opposing said output mirror,
    said output mirror having in its side facing said feedback mirror an optical power in a lateral axis in which the hybrid resonator is unstable,
    said feedback mirror having a smaller optical power in the axis in which the resonator is stable than the optical power in the axis in which the resonator is unstable, said stable and unstable axes being orthogonal lateral axes.

2. The laser arrangement according to claim 1, comprising a DC voltage supplier to apply pulsed DC electric discharge on said DC discharge electrodes.

3. The laser arrangement according to claim 2, wherein said DC voltage supplier comprises a DC source, a pulse shaper to shape into pulses a DC signal provided by the DC source, a high voltage transformer to provide a high output voltage for exciting the discharge medium and an output smoother.

4. The laser arrangement according to claim 1, wherein the output mirror and feedback mirror constitute a co-focal negative branch unstable resonator in the axis in which the hybrid resonator is unstable.

5. The laser arrangement according to claim 1, wherein said output mirror comprises a mask to determine the lateral cross section of the output beam.

6. The laser arrangement according to claim 1, wherein said output mirror reflects mainly a desired radiation wavelength and transmits other wavelengths.

7. The laser arrangement according to claim 6, wherein said feedback mirror reflects said desired radiation wavelength and transmits other wavelengths.

8. The laser arrangement according to claim 1, comprising an RF voltage supplier, the RF voltage supplier comprising a RF source to apply RF pulses on said RF electrodes.

9. A method for providing a laser beam, the method comprising:
    applying a DC discharge between DC discharge electrodes disposed at opposite ends of an elongated discharge region, the elongated discharge region including a discharge medium to be excited to induce laser radiation and disposed within an elongated tube;
    applying a RF discharge transverse to said DC discharge, said RF discharge applied between RF electrodes disposed at opposite elongated sides of the elongated discharge region,
    wherein said elongated discharge region comprises a hybrid stable and unstable laser resonator having an output mirror disposed at an output end of an elongated tube and a feedback mirror disposed at a second end of the elongated tube opposing said output mirror,
    said output mirror having in its side facing said feedback mirror an optical power in a lateral axis in which the hybrid resonator is unstable,
    said feedback mirror having a smaller optical power in the axis in which the resonator is stable than the optical power in the axis in which the resonator is unstable, said stable and unstable axes being orthogonal lateral axes.

10. The method according to claim 9, wherein said DC discharge is applied by a DC voltage supplier to apply pulsed DC electric discharge on said DC discharge electrodes.

11. The method according to claim 10, wherein said DC voltage supplier comprises a DC source, a pulse shaper to shape into pulses a DC signal provided by the DC source, a high voltage transformer to provide a high output voltage for exciting the discharge medium and an output smoother.

12. The method according to claim 9, wherein said output mirror and said feedback mirror constitute a co-focal negative branch unstable resonator in the axis in which the hybrid resonator is unstable.

13. The method according to claim 9, wherein said output mirror comprises a mask to determine the lateral cross section of the output beam.

14. The method according to claim 9, wherein said output mirror reflects mainly a desired radiation wavelength and transmits other wavelengths.

15. The method according to claim 14, wherein said feedback mirror reflects said desired radiation wavelength and transmits other wavelengths.

16. The method according to claim 9, wherein said RF discharge is applied by a RF voltage supplier, the RF voltage supplier comprising a RF source and an inductor connected to said RF electrodes to apply RF pulses on said RF electrodes.

* * * * *